United States Patent [19]
Kohonen et al.

[11] Patent Number: 5,641,402
[45] Date of Patent: Jun. 24, 1997

[54] MULTISTAGE DISC FILTER

[75] Inventors: Raimo Kohonen; Ari Pelkio, both of Savonlinna, Finland

[73] Assignee: Ahlstrom Machinery Oy, Helsinki, Finland

[21] Appl. No.: 491,856

[22] PCT Filed: Feb. 3, 1994

[86] PCT No.: PCT/FI94/00049

§ 371 Date: Aug. 23, 1995

§ 102(e) Date: Aug. 23, 1995

[87] PCT Pub. No.: WO94/17893

PCT Pub. Date: Aug. 18, 1994

[30] Foreign Application Priority Data

Feb. 9, 1993 [FI] Finland ................................ 930543

[51] Int. Cl.$^6$ ................................................ B01D 33/09
[52] U.S. Cl. .............. 210/330; 210/331; 210/346; 210/347; 210/404; 210/486; 162/199; 162/217; 162/230; 162/274; 162/411; 162/903
[58] Field of Search ................................ 210/330, 331, 210/346, 347, 404, 486; 162/199, 217, 230, 274, 411, 903

[56] References Cited

U.S. PATENT DOCUMENTS

| | | | |
|---|---|---|---|
| 2,027,652 | 1/1936 | Raisch | 210/201 |
| 3,438,505 | 4/1969 | Luthi . | |
| 3,452,874 | 7/1969 | Keller et al. | 210/331 |
| 3,471,026 | 10/1969 | Riker | 210/327 |
| 3,917,534 | 11/1975 | Moore . | |
| 4,123,363 | 10/1978 | Koskinen . | |
| 4,152,267 | 5/1979 | Davis et al. . | |
| 4,162,982 | 7/1979 | Chesner . | |
| 4,818,401 | 4/1989 | Lawrence | 210/330 |

FOREIGN PATENT DOCUMENTS

WO81/00359  2/1981  WIPO .

*Primary Examiner*—W. L. Walker
*Attorney, Agent, or Firm*—Nixon & Vanderhye P.C.

[57] ABSTRACT

A disc filter used in the pulp and paper industry meets modern requirements by axially dividing the tank and shaft (with the flow channels) into at least two separate and distinct portions, so that the treatment of pulp in several different stages using the same disc filter is possible.

20 Claims, 4 Drawing Sheets

MULTISTAGE DISC FILTER

CROSS-REFERENCE TO RELATED APPLICATION

This application is the U.S. national phase of International Application No. PCT/FI94/00049 internationally filed Feb. 3, 1994.

BACKGROUND AND SUMMARY OF THE INVENTION

The present invention relates to an apparatus for treating pulp. The object of the present invention is especially to develop the disc filter used in the pulp and paper industry to meet the requirements of the present time.

A disc filter comprises, as known, wire-coated discs mounted on a horizontal shaft in a vessel containing e.g. fiber suspension. The discs comprise a number of wire-coated sectors, in the inside of which a suction is generated one way or the other for removing liquid inside the sector from a pulp layer accumulating on the wire surface. The filtrate thus obtained is supplied to a suction apparatus through a hollow shaft of the filter or from each sector through a filtrate channel leading to a valve apparatus at the end of the shaft. Said suction apparatus may be a suction leg or even a centrifugal pump. It is a typical feature of the disc filters that the ratio of the filtering surface of the filter to the outer dimensions thereof is very large compared to a drum filter, which is another alternative in the industry. On the other hand, now that drum filters operating on a multi-stage principle have been developed, it must be noted that disc filters according to the prior art are typically one-stage apparatuses.

Our invention is partially based on a disc filter disclosed in U.S. Pat. No. 4,123,363. Said disc filter represents one of the most developed disc filter types, because the hollow shaft interior is provided with a stationary slide/valve in such a way that said space is divided into axial chambers, of which each may be separately connected to a suction apparatus of its own. This means in practice that a number of different filtrates may be removed from the disc filter. In most cases this feature is utilized in such a way that the so called initial filtrate obtained at the beginning of each filtering stage and the actual, clear filtrate are separated. However, a disc filter in accordance with this patent is still a single-stage apparatus, from which both filtrates are removed separately or the so called initial filtrate is possibly supplied back to the feed of the suspension entering in the filter.

In order for a disc filter to maintain a competent position relative to a drum filter, a multistage version of the disc filter should be developed, whereby it would become possible to replace the previously regularly used two disc filters with a single two-stage filter. The savings thus gained both in space and in equipment investments would be significant.

The purpose of the present invention is to eliminate said restriction of the disc filter and to make such improvements in the disc filter that it may be used, if so desired, as a multistage apparatus.

A characterizing feature of a disc filter in accordance with the present invention is that the tank and each of the flow channels in the shaft are divided into at least two chambers separated from each other by radially extending partitions.

BRIEF DESCRIPTION OF THE DRAWINGS

The apparatus in accordance with the present invention is described more in detail below, by way of example, with reference to the accompanying drawings, in which FIG. 1 schematically illustrates an axially sectional view of the disc filter in accordance with the present invention.

DETAILED DESCRIPTION OF THE DRAWINGS

Figure 1:
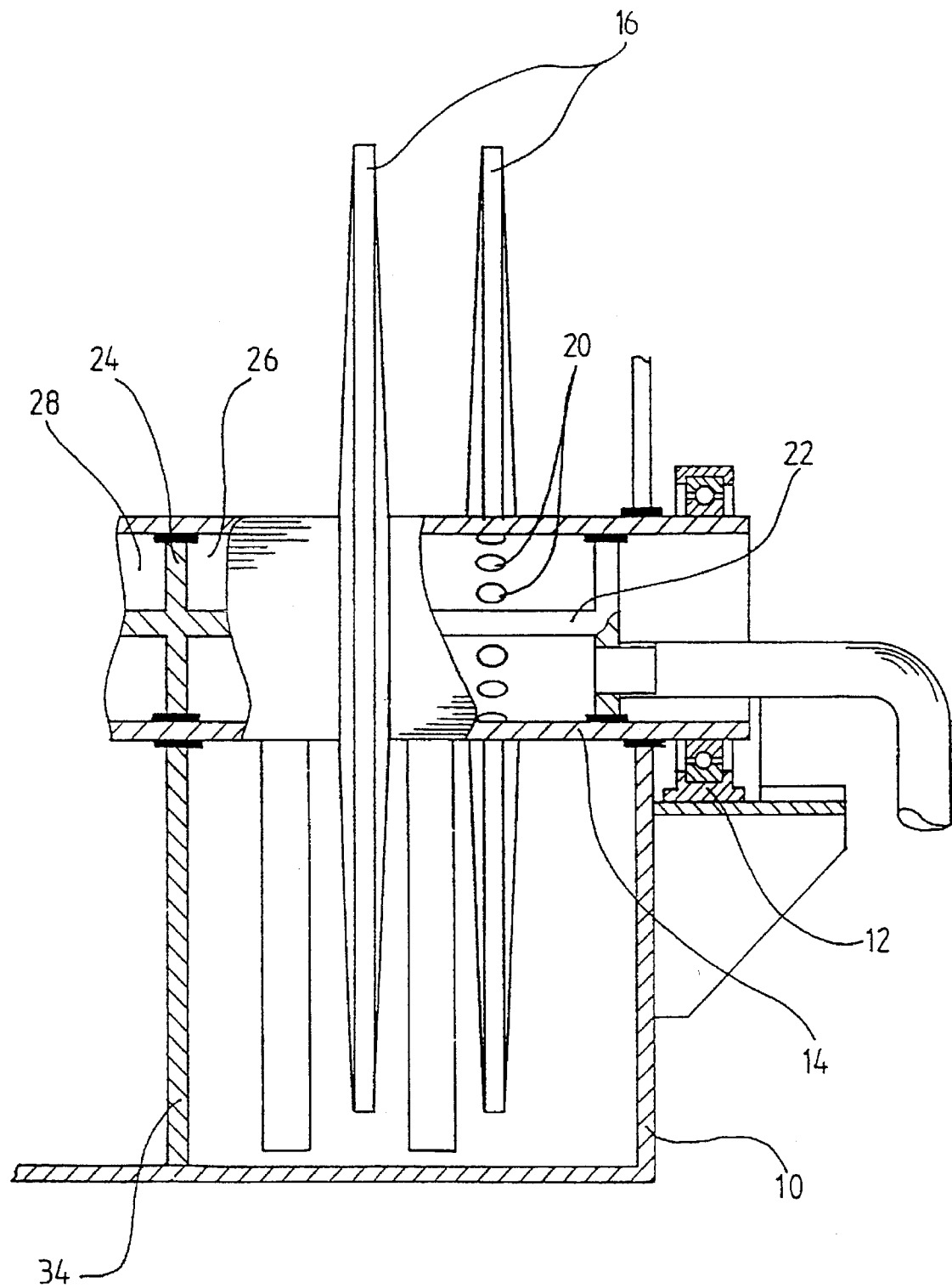
Figure 2:
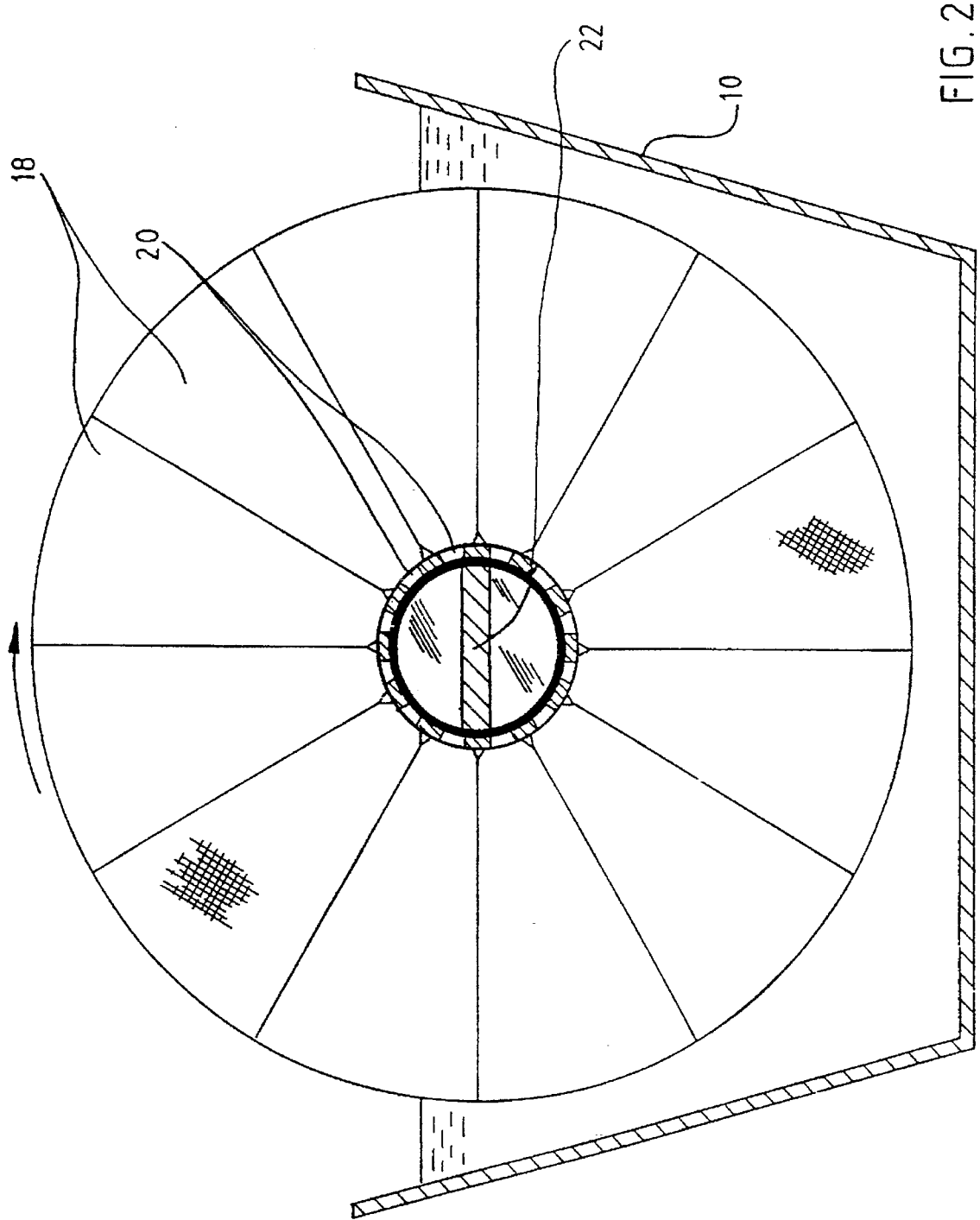
FIG. 2 schematically illustrates a radially sectional view of the disc filter in accordance with the present invention.

According to FIGS. 1 and 2 a disc filter comprises a tank 10, bearing blocks 12 mounted to the ends of the tank 10 and a tubular shaft 14 sealed at the ends of the tank and mounted with bearings on the bearing blocks 12. The tubular shaft 14 is provided with a number of radial filter discs 16, which are formed by sectors 18 attached side by side according to FIG. 2. The sectors are wire-coated in a known manner, as shown, for example, in U.S. Pat. Nos. 3,438,505, 3,917,534, 4,152,267 and 4,162,982. Each sector is in the case of FIG. 1 mounted via an opening 20 to the interior of the tubular shaft 14, which is divided according to U.S. Pat. No. 4,123,363 into separate axial chambers by a slide member 22. The interior of the tubular shaft 14 is divided in this embodiment according to a preferred embodiment of the invention into two chambers 26 and 28 axially separated by a partition wall 24 arranged to the slide member 22. The axial division of the interior of said tubular shaft 14 into two also results in that both ends of the tubular shaft 14 are provided with conduits in connection with the valve members, by means of which conduits the separate chambers may be connected to a suction source or to a source for medium removing a pulp cake. Respectively, a partition wall 34 extends from the bottom of the tank 10 up to the tubular shaft and is sealed with the outer surface thereof so that the partition walls 24 and 34 face each other at opposite sides of the wall of the tubular shaft 14. Thus by mounting the partition walls at a desired position in the tank of the filter it is possible to arrange the filter either symmetric, whereby both sides of the partition wall 34 have equal amount of filter discs 16 or asymmetric, whereby the amounts of discs 16 at different sides of the partition wall differ. Whether the filter is symmetric or asymmetric totally depends on the use and purpose of the filter.

The stationary partition walls 24 and 34 disclosed in FIG. 1 show the structurally simplest arrangement to be realized. If and when it is desired to have a disc filter, which may be adjusted at the mill, the partition walls 24 and 34 must be made movable or otherwise their positioning must be made adjustable.

Figure 3:
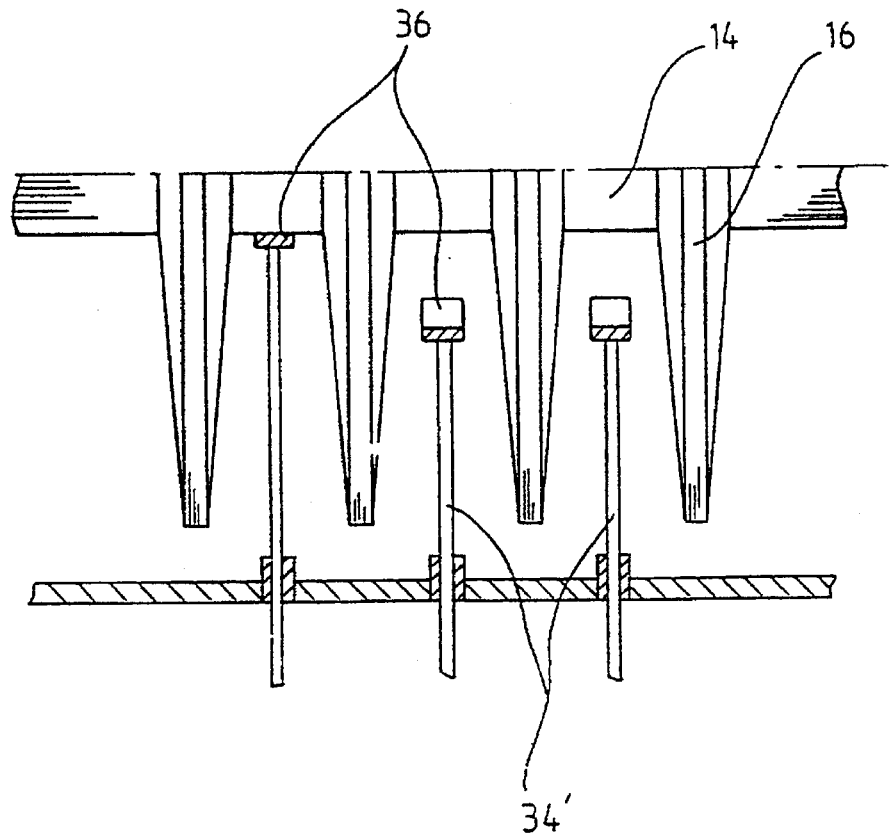
FIG. 3 schematically illustrates a preferred partition wall arrangement of the disc filter in accordance with the present invention.

An alternative is to provide a movable partition wall 34' between some of the discs 16 as shown in FIG. 3, which partition wall may be moved either into contact with the tubular shaft 14 or maintained at the "bottom position", whereby the fiber suspension may fill the tank 10 when flowing into it at both sides of the partition wall. Of course, the partition wall 34' is provided with an appropriate sealing member 36 on the edge facing the tubular shaft, by which the partition wall is sealed relative to the tubular shaft in order to prevent the suspensions of different tank sections from being mixed.

Figures 4, 4A:
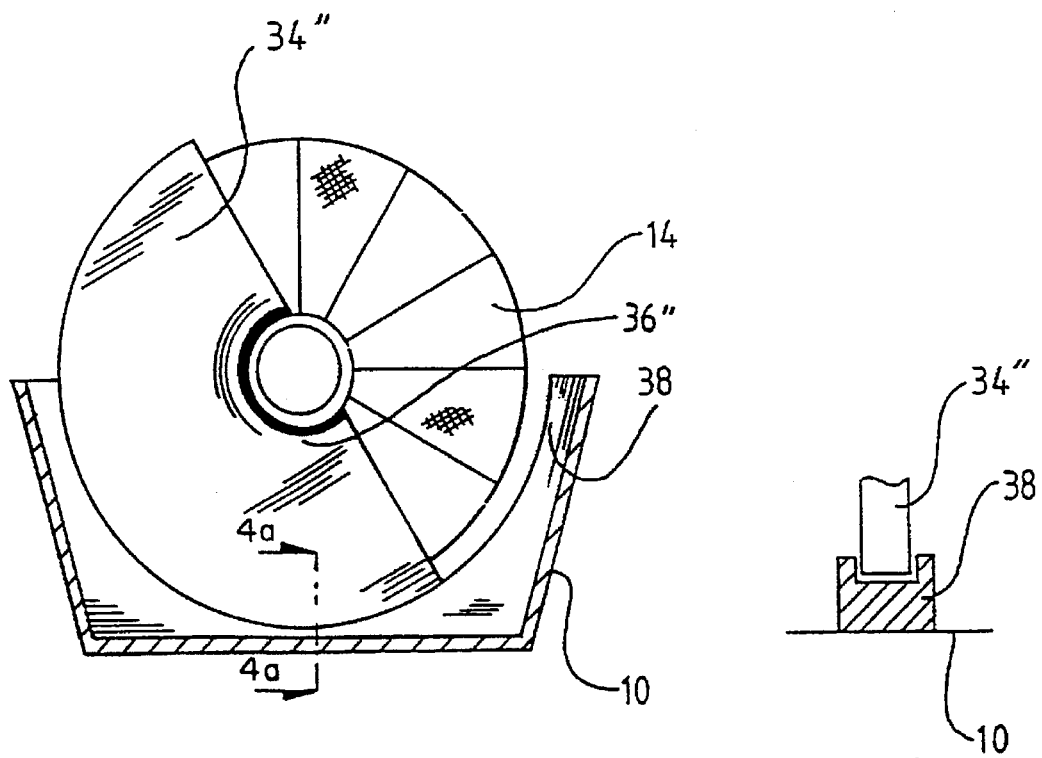
FIG. 4 and 4a schematically illustrate a second alternative embodiment of a partition wall arrangement of the disc filter in accordance with the present invention.

It is, of course, possible to make a partition wall 34" sealed by seal members 36" relative to the tubular shaft also to be lifted up or, better, to be turned according to FIG. 4, whereby said partition wall leaves enough space to the other side of the tank 10 for the suspension to flow to fill uniformly the whole tank. Preferably wall portions 38 are arranged to the bottom of the tank, on the edge of which facing the tubular shaft 14 there is a recess having a U-shaped cross-section (FIG. 4a), in which, in accordance with the embodiment shown in the drawing, the semicircular, even larger if required, partition wall 34" slides. By manufacturing a partition wall and/or the covering of the U-shaped recess of the wall element of a material having a small friction coefficient, said material operates also as member sealing tank sections.

Figure 5:
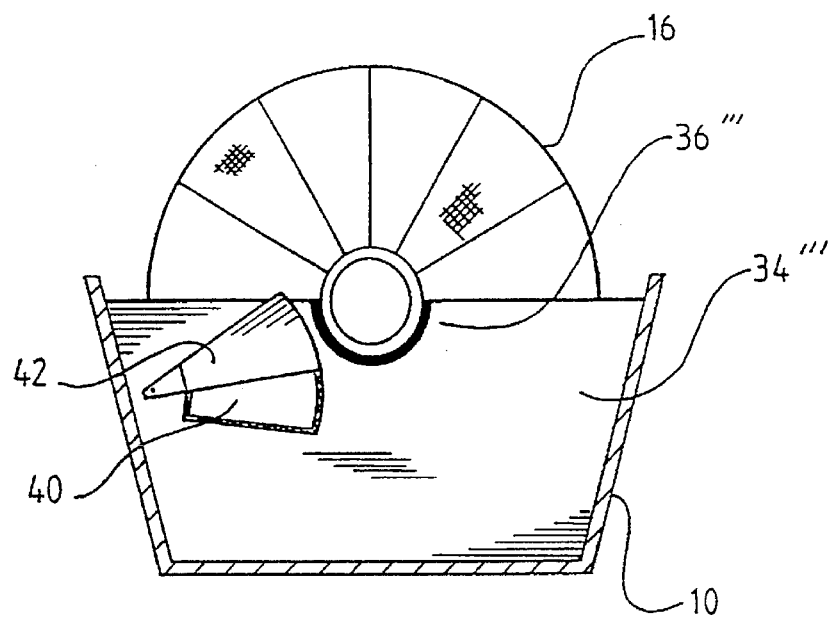
FIG. 5 schematically illustrates a third preferred partition wall arrangement of the disc filter in accordance with the present invention.

A third alternative is according to FIG. 5 to arrange a number of stationary partition walls 34''' extending to the tubular shaft 14 and sealed 36''' relative to said tubular shaft, which partition walls, however, have an opening 40, which is large enough for the fiber suspension to fill through openings 40 the whole tank 10 or preferably the whole tank section in question. Each opening 40 has been provided with a valve 42 or a closing plate in front of the opening 40, whereby it is easy to adjust the filter in a desired manner. Of course, also the closing plate is sealed at the edges of the opening 40 in such a way that the suspensions in the neighbouring tank sections do not get mixed.

It is also self-evident that also several other arrangements exist for moving the partition walls or forming flow openings, but it is considered unnecessary to describe them in this connection anymore, since a number of alternatives have already been described.

Figure 6:
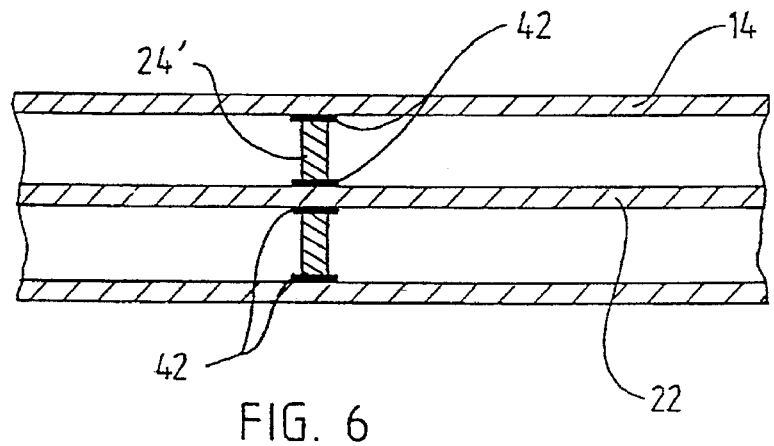
FIG. 6 schematically illustrates a preferred embodiment of a partition wall in a tubular shaft of the disc filter in accordance with the present invention.

FIG. 6 illustrates a method of adjusting the position of the partition wall 24' dividing the interior of the tubular shaft 14 to correspond the partition wall dividing the tank into sections. According to the drawing the partition wall 24' is arranged to slide with the support of the sealings 42 relative to the slide member 22, whereby it is possible to push and/or pull it with mechanical devices to an appropriate position. What makes it a little more complicated is that the interior of the tubular shaft is divided at least in the embodiment of the drawing by a slide member into three chambers, which must not have any connection with each other. Thus the partition wall 24' should be formed of three separate portions which all must be moved contemporarily or at least for an equal distance.

Another possibility for the arrangement of the partition wall of the tubular shaft is that the partition wall is mounted to a slide member and the slide member is axially movable relative to the tubular shaft. This results in that the slide member extends from the ends of the tubular shaft to the outside of the filter for a distance required for its movements or in that both sides of the slide member, that is both sides of the partition wall, are provided with a telescopically extending/shortening portion, whereby the slide member does not have to extend outside the overall dimensions of the filter.

Figure 7:
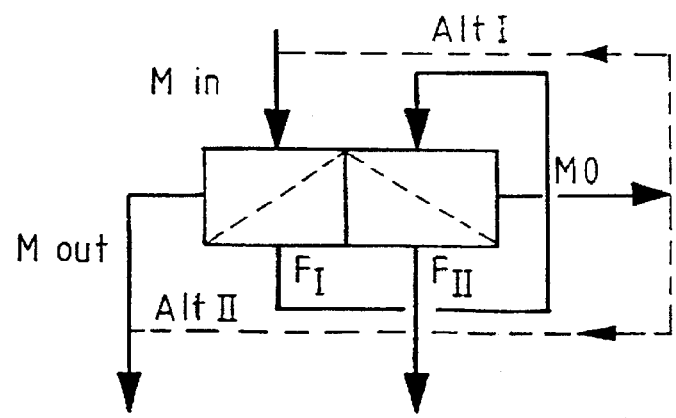
FIG. 7 schematically illustrates a connection in accordance with a preferred embodiment of the disc filter in accordance with the present invention.

According to FIG. 7 it is possible to use a two-stage disc filter in accordance with the present invention in such a way that the pulp $M_{in}$ to be treated is introduced into the tank on the left hand side of the filter, a pulp cake is formed on the disc surfaces and is discharged through a conduit $M_{out}$ and a filtrate $F_I$ is led along the channel to the tank on the right hand side of the filter. Pulp is formed from the zero fibers in the filtrate on the disc surfaces, from which the pulp $M_o$ is further discharged to be combined, for example, with the pulp thickened in the first stage (broken line $Alt_I$) and on the other hand the fiber-free filtrate $F_{II}$ is supplied to the effluent treatment. In the above-described embodiment it is possible to arrange the removal of pulp in both stages also to the same discharge apparatus (broken line $Alt_{II}$), in which the fibrous material is remixed.

As may be seen in the above description our invention has succeeded to redesign the previously known single-stage disc filter into two- or multistage (if required) disc filter. Although the previous examples do not illustrate a multi-stage arrangement, it is completely possible by using partition walls in accordance with the present invention. Only the focusing of the suction and the removal of the filtrate to the sections/stages of the filter not at the end causes additional constructions, such as a valve member for each section/stage in connection with the tubular shaft. Further, it is evident that above is described only one embodiment, in other words; the chambers being restricted by the slide/valve member for the flow channels containing a tubular shaft. It is, however, clear that the same kind of partition wall may be applied to a shaft arrangement of any type regardless of whether the tubular shaft is continuous, divided into several chambers or contains a number of separate tubular flow channels, leading from at least one sector to the suction apparatus or like connected to the valve member. If continuous flow channels leading all the way from the sectors to the valve member at an end of the tubular shaft are used, no separate partition wall is needed inside the possibly tubular shaft, but the flow channels begin to lead to a second valve member or like at another end of said shaft. Further, although the drawings illustrate a disc filter open at the top, the invention may be applied in a filter provided with a top cover or in a pressurized filter as well.

We claim:

1. Apparatus for treating fiber suspensions, comprising:
a tank for containing a fiber suspension, said tank having a bottom and a substantially open top;
a tubular shaft extending substantially horizontally through the tank, having a hollow interior, and rotatable about a substantially horizontal axis, and including dividers dividing the hollow interior into a plurality of axially extending parallel flow channels;
a plurality of wire-coated discs having radial sectors disposed on said shaft, said discs in fluid communication with said shaft hollow interior; and
means for substantially radially, with respect to said shaft, dividing said tank and said shaft flow channels each into at least two distinct chambers.

2. Apparatus as recited in claim 1 wherein said substantially radially dividing means comprise at least one substantially vertically extending partition in said tank.

3. Apparatus as recited in claim 2 wherein said at least one substantially vertically extending partition comprises at least one substantially solid disc sector supported by said shaft and extending downwardly therefrom supported thereby.

4. Apparatus as recited in claim 2 wherein said at least one substantially vertically extending partition comprises a plate extending substantially the entire vertical distance between said tank bottom and said shaft.

5. Apparatus as recited in claim 4 wherein said plate is substantially vertically movable from a first position in which it provides an effective partition, extending above the level of suspension in said tank, to a second position which is below the level of suspension in said tank so that it does not form an effective partition.

6. Apparatus as recited in claim 5 wherein said at least one partition comprises a plurality of partitions defined by substantially vertically extending plates.

7. Apparatus as recited in claim 4 wherein said plate is stationary.

8. Apparatus as recited in claim 1 wherein said radially dividing means comprises a plurality of distinct radial partitions, at least one partition disposed in each flow channel.

9. Apparatus as recited in claim 8 wherein said radially dividing means further comprise at least one substantially vertically extending partition in said tank.

10. Apparatus as recited in claim 9 wherein each tank partition is substantially vertically aligned with a plurality of radial partitions in said flow channels.

11. Apparatus as recited in claim 5 wherein said plate has a sealing element disposed on a top portion thereof, for sealingly engaging said shaft.

12. Apparatus as recited in claim 3 further comprising a substantially U-shaped cross-section element mounted to said tank, including said tank bottom, receiving said substantially solid disc sector therein, and substantially in sealing engagement with said substantially solid disc sector.

13. Apparatus as recited in claim 12 wherein said substantially solid disc sector may be moved in, and with respect to, said element mounted to said tank to allow easy filling of said tank.

14. Apparatus as recited in claim 1 wherein said substantially radially dividing means divides said tank asymmetrically so that interior tank volumes of different size, and a different number of wire coated discs in each, are provided.

15. Apparatus as recited in claim 1 wherein said radially dividing means divides said tank symmetrically, so that at least two substantially equal size tank volumes, with an equal number of wire coated discs in each, are provided.

16. A method of treating cellulose pulp utilizing a tank for containing the pulp, a tubular shaft extending substantially horizontally through the tank, having a hollow interior, and rotatable about a substantially horizontal axis, and including dividers dividing the hollow interior into a plurality of axially extending parallel flow channels, a plurality of wire-coated discs having radial sectors disposed on the shaft, the discs in fluid communication with the shaft hollow interior, and the tank and the shaft flow channels each radially divided into at least first and second distinct chambers, said method comprising the steps of:

(a) supplying a first cellulose pulp to the first chamber of the tank;

(b) rotating the shaft about its axis to cause pulp fibers to form a cake on the wire coated discs in the first tank chamber, and to thicken the first pulp by withdrawing a first liquid filtrate from the pulp through the first flow channel chambers;

(c) withdrawing the thickened pulp from the first tank chamber;

(d) introducing a second cellulose pulp, having different properties than the first cellulose pulp, into the second tank chamber, the shaft simultaneously with the practice of step (b) rotating the wire coated discs in the second tank chamber to thicken the pulp in the second tank chamber while withdrawing a second liquid filtrate from the pulp through the second flow channel chambers; and (e) withdrawing the thickened pulp from the second tank chamber.

17. A method as recited in claim 16 wherein step (d) is practiced by introducing the thickened pulp withdrawn from the first chamber in the practice of step (c) as the second pulp.

18. A method as recited in claim 16 wherein the tank is divided into at least two distinct chambers by a substantially vertical partition extending upwardly from the tank bottom toward the shaft; and comprising the further step of reciprocating the partition to move it from a position in which it effectively divides the tank into first and second chambers to a position in which it does not effectively divide the tank into first and second chambers.

19. A method as recited in claim 18 wherein said reciprocating step is practiced in order to facilitate filling of the tank by introduction of pulp through a side wall of the tank.

20. A method as recited in claim 16 wherein the tank is divided into at least two distinct chambers by a substantially vertical partition supported by the shaft, but not normally rotatable therewith; and comprising the further steps of: facilitating easy filling of the tank by pivoting the substantially vertical partition about the shaft axis to move it with respect to the tank bottom; and introducing pulp into the tank to fill it from below the top of the tank, the introduced pulp moving past the pivoted partition and filling the chambers on either side thereof.

* * * * *